(12) United States Patent
Dong et al.

(10) Patent No.: US 8,505,316 B2
(45) Date of Patent: Aug. 13, 2013

(54) DIRECT EXPANSION EVAPORATOR

(76) Inventors: Lingyu Dong, Temple City, CA (US);
Chundong Dong, Temple City, CA (US)

( * ) Notice: Subject to any disclaimer, the term of this patent is extended or adjusted under 35 U.S.C. 154(b) by 0 days.

(21) Appl. No.: 13/385,246

(22) Filed: Feb. 8, 2012

(65) Prior Publication Data
US 2012/0137719 A1 Jun. 7, 2012

Related U.S. Application Data

(63) Continuation-in-part of application No. 12/462,107, filed on Jul. 28, 2009, now Pat. No. 8,272,231.

(51) Int. Cl.
*F25B 1/00* (2006.01)

(52) U.S. Cl.
USPC .............................................. 62/115; 62/389

(58) Field of Classification Search
USPC ............... 62/342, 340, 384, 390, 389, 115; 165/154, 184; 426/519, 522; 99/453, 455; 29/890.03
See application file for complete search history.

(56) References Cited

U.S. PATENT DOCUMENTS

| | | | |
|---|---|---|---|
| 5,555,734 A * | 9/1996 | Welch et al. | 62/66 |
| 5,603,229 A * | 2/1997 | Cocchi et al. | 62/343 |
| 5,916,248 A * | 6/1999 | Bravo | 62/68 |
| 6,010,035 A * | 1/2000 | Estruch | 222/142 |
| 6,588,219 B2 * | 7/2003 | Zevlakis | 62/73 |
| 6,619,067 B2 * | 9/2003 | Hiramatsu | 62/354 |
| 6,651,448 B2 * | 11/2003 | Ross et al. | 62/68 |
| 6,877,334 B2 * | 4/2005 | Hiramatsu | 62/354 |
| 6,988,372 B2 * | 1/2006 | Ross et al. | 62/69 |
| 7,266,952 B2 * | 9/2007 | Ross et al. | 62/68 |
| 2006/0168970 A1* | 8/2006 | Ross et al. | 62/69 |
| 2006/0277936 A1* | 12/2006 | Norden et al. | 62/340 |
| 2008/0092580 A1* | 4/2008 | Mavridis et al. | 62/342 |

* cited by examiner

*Primary Examiner* — Mohammad M Ali
(74) *Attorney, Agent, or Firm* — Raymond Y. Chan; David and Raymond Patent Firm

(57) ABSTRACT

A direct expansion evaporator includes an inner guiding duct defining a feeding channel for guiding raw material, and an outer guiding duct enclosing the inner guiding duct therewithin to form a heat exchange channel between the outer and inner guiding ducts for guiding refrigerant flowing along the heat exchange channel to heat-exchange with the raw material along the feeding channel, wherein a helix indention is formed at the outer guiding duct to form the heat exchange channel partitioned by a helix partition, wherein a peak of the helix partition is biased against an outer surrounding wall of the inner guiding duct to conceal the heat exchange channel along the inner guiding duct in a weld-less manner.

14 Claims, 8 Drawing Sheets

DIRECT EXPANSION EVAPORATOR

CROSS REFERENCE OF RELATED APPLICATION

This is a Continuation-In-Part application that claims the benefit of priority under 35 U.S.C. §119 to a non-provisional application, application Ser. No. 12/462,107, filed Jul. 28, 2009 U.S. Pat. No. 8,272,231.

BACKGROUND OF THE PRESENT INVENTION

1. Field of Invention

The present invention generally relates to a heat exchange apparatus, and more particularly to a direct expansion evaporator for a refrigeration system, wherein the direct expansion evaporator provides two heat-exchange stages for making a frozen product from raw material while being energy efficient.

2. Description of Related Arts

A direct expansion evaporator for heat exchanging, such as a heat exchanger, is commonly and widely applied in lots of areas, such as industrial or medical application. For example, the heat exchanger is used in a chemical factory for cooling down a waste to prevent overheating the waste. Heat exchange is also applied in refrigeration, freezer system, or air conditioner for exchanging the heat from the air or the frozen product to keep it under certain temperature.

Most of the heat exchange used for cooling system applies a refrigerant to provide a lower temperature source, which has the temperature below to the targeted object for being cooled, so that the heat exchanging is driven by the driving temperature between the refrigerant and the object to achieve the cooling purpose.

Traditionally, the refrigerant is stored in a high pressure container and released via an expansion valve to a heat exchange chamber, which has lower pressure than the high pressure container, so that the refrigerant is rapidly evaporated to gaseous phase due to the pressure drop, so as to provide the thermal energy to the heat exchange chamber. The phase change from liquid to gas of the refrigerant absorbs dramatic heat energy, so that the targeted object is able to be cooled in a short period. Therefore, the heat exchanger plays an important role of using the refrigerant for a cooling system, such as for making a frozen product.

In other words, evaporator is a critical heat-exchanging component in the refrigeration system. It is a decisive factor of the system capacity and efficiency. When liquid refrigerant enters the evaporator through the expansion valve or a capillary tube, it rapidly vaporizes due to the sudden expansion of volume and reduction of pressure. During this vaporization process, the refrigerant absorbs heat from the cooling medium through the evaporator wall or housing with good thermal conductivity.

There are several types of evaporator commonly used for cooling system in the existing market: coil type, fin type, and spiral channel type. The coil type evaporator has a copper tube filling with refrigerant and a feeding tube for containing raw material therein. The copper tube is adapted at a position that the copper tube is winding at the outer surface of the feeding tube, so that the thermal energy is transferred through the walls of copper tube and feeding tube for heat exchanging. Therefore, the heat exchange takes place through not only the wall of the feeding tube but also the wall of the copper tube.

However, the contacting area between the copper tube and the feeding tube is limited. The heat is conductively transferred through two layers, the walls of copper tube and feeding tube, so that the heat transferring is inefficient.

The fin type heat exchanger has a plurality of fins welded on the refrigeration cylinder to provide alternatively channels for the flow of the refrigerant from the inlet to the outlet so as to prolong the traveling distance and time of the refrigerant. Although it has higher heat transfer rate to perform a relatively more efficient heat exchanging, it is complicated in fabrication procedure. Thus, it also results in high manufacturing cost and low productivity.

In order to increase the efficiency of heat exchanger, the spiral type heat exchanger is also provided for enhancing the heat transferring rate. The spiral type has threads on the inner surface of outer cylinder enclosing the feeding pipe therein, so that the refrigerant is flowing in the spiral threads channel between the feeding pipe and the outer cylinder. Though it enhances the heat exchanging efficiency, the spiral threads outer cylinder is relatively longer and needs precise assembly process. Thus, it is high in manufacturing cost and not suitable for batch process or mass production.

Therefore, using the direct expansion evaporator or heat exchanger to exchange heat for making a frozen product needs a relatively more efficient expansion evaporator or heat exchanger. Take ice cream as the frozen product for example. The ice cream raw material made in the traditional spiral type can not efficiently provide the thermal energy that needed for freezing the ice cream to a desired hardness. The spiral type does not have enough expansion area in the heat exchange channel for release the thermal energy in the expanded evaporation manner. Thus, the spiral type of direct expansion evaporator uses relatively more power and is not efficient for using in batch process for producing a massive amount of frozen product.

For another example, frozen yogurt needs more thermal energy to form the final frozen product, otherwise, it usually tempts to be too soggy or liquefied to become the frozen yogurt. The existing heat exchangers of direct expansion evaporator cannot provide an efficient and capable of producing a relatively larger amount of frozen products. Therefore, it is an attempt of the present invention to provide a more efficient direction expansion evaporator, so as to prevent the energy waste and make better quality of frozen product.

SUMMARY OF THE PRESENT INVENTION

The invention is advantageous in that it provides a direct expansion evaporator, which is able to be relatively more efficient for the heat exchanging process of making frozen product from raw material.

Another advantage of the invention is to provide a direct expansion evaporator, wherein the outer and inner guiding ducts are coupled in a weld-less manner to guide the raw material and refrigerant to flow along the feeding channel and the heat exchange channel respectively for heat-exchanging.

Another advantage of the invention is to provide a direct expansion evaporator, which provides two heat-exchange states for making a frozen product from raw material while being energy efficient.

Another advantage of the invention is to provide a direct expansion evaporator, wherein the flow direction of the raw material is opposite to the flow direction of the refrigerant to enhance the efficiently transferring thermal energy to make the frozen product.

Another advantage of the invention is to provide a direct expansion evaporator, wherein the two heat-exchange stages are a pre-cooling stage for initially pre-cooling the raw material at the entrance and a freezing stage for conclusively making the frozen product before the exit, so as to efficiently transferring thermal energy to make the frozen product.

Another advantage of the invention is to provide a direct expansion evaporator, which is able to completely evaporate the refrigerant from liquid to gaseous phase, so as to prevent the back flow of the liquid refrigerant.

Another advantage of the invention is to provide a direct expansion evaporator, wherein the heat exchange channel has a pre-cooling portion and a freezing portion extending therefrom to provide the pre-cooling stage and the freezing stage respectively.

Another advantage of the invention is to provide a direct expansion evaporator, wherein the refrigerant initially enters into the heat exchange channel at the dispensing end of the feeding channel and exits the heat exchange channel at the feeding end of the feeding channel. Therefore, when the refrigerant initially enters into the heat exchange channel, the refrigerant provides sufficient heat absorbing power at the freezing portion of the heat exchange channel. When the refrigerant passes through the pre-cooling portion of the heat exchange channel, the refrigerant will gradually vaporize to the gaseous phase for pre-cooling the raw material.

Another advantage of the invention is to provide a direct expansion evaporator, wherein the traveling time of the refrigerant is prolonged at the pre-cooling stage to ensure the liquid refrigerant being completely evaporated.

Another advantage of the invention is to provide a direct expansion evaporator, which is relatively simple in structure and high efficient in converting chemical energy to thermal energy for heat exchanging process of making frozen product, so as to minimize the manufacturing cost of the direct expansion evaporator of the present invention for incorporating with the refrigeration system.

Additional advantages and features of the invention will become apparent from the description which follows, and may be realized by means of the instrumentalities and combinations particular point out in the appended claims.

According to the present invention, the foregoing and other objects and advantages are attained by a direct expansion evaporator of the present invention comprises:

a feeding channel having a feeding end and a dispensing end for the raw material feeding through the feeding channel;

a heat exchange channel thermally communicating with the feeding channel, wherein the heat exchange channel has a pre-cooling portion defining from the feeding end of the feeding channel and a freezing portion to the dispensing end to thermally communicate with the feeding channel in a two-stage evaporation manner; and a refrigerant passing through the heat exchange channel for heat exchanging with the raw material within the feeding channel, wherein when the refrigerant flows at the pre-cooling portion of the heat exchange channel, the raw material fed from the feeding end of the feeding channel is initially pre-cooled at a pre-cooling temperature, and when the refrigerant flows at the freezing portion of the heat exchange channel, the raw material is then substantially frozen to form the frozen product before the frozen product is dispensed at the dispensing end of the feeding channel while being energy efficient.

In accordance with another aspect of the invention, the present invention comprises a method of manufacturing a direct expansion evaporator for making frozen product from raw material, comprising the following steps.

(A) Configure an inner guiding duct to define a feeding channel therewithin, wherein the feeding channel has a feeding end and a dispensing end for the raw material feeding through the feeding channel.

(B) Receive the inner guiding duct within an outer guiding duct to form a heat exchange channel between the inner and outer guiding duct to thermally communicate with the feeding channel.

(C) Configure the heat exchange channel to form a pre-cooling portion being extended toward the feeding end of the feeding channel and a freezing portion being extended toward the dispensing end.

(D) Guide the raw material and refrigerant passing through the feeding channel and the heat exchange channel respectively for heat-exchanging, wherein the raw material is initially pre-cooled at the pre-cooling portion of said the exchange channel when entering into the feeding end of the feeding channel and is substantially frozen at the freezing portion of the heat exchange channel to form the frozen product before the frozen product is dispensed at the dispensing end of the feeding channel.

In accordance with another aspect of the invention, the present invention comprises a direct expansion evaporator for making frozen product from raw material, comprising:

an inner guiding duct defining a feeding channel thereaolong and having a feeding end and a dispensing end for guiding the raw material flowing along the feeding channel from the feeding end to the dispensing end; and an outer guiding duct, wherein the inner guiding duct is coaxially enclosed within the outer guiding duct to form a heat exchange channel between the outer and inner guiding ducts for guiding refrigerant flowing along the heat exchange channel to heat-exchange with the raw material along the feeding channel, wherein a helix indention is formed at the outer guiding duct to form the heat exchange channel partitioned by a helix partition, wherein a peak of the helix partition is biased against an outer surrounding wall of the inner guiding duct to conceal the heat exchange channel along the inner guiding duct in a weld-less manner.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
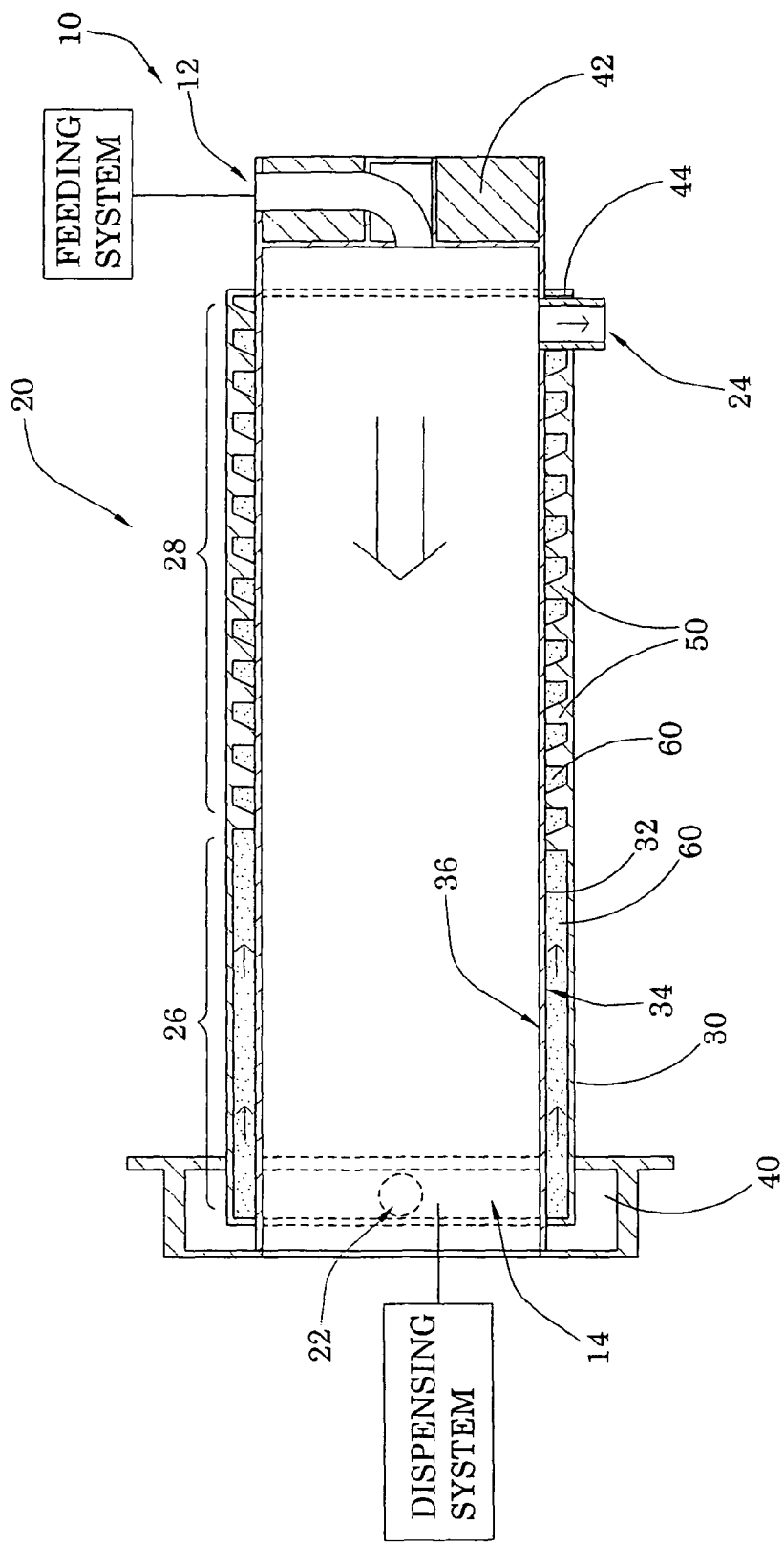
FIG. 1 is a sectional view of a direct expansion evaporator according to a preferred embodiment of the present invention.
Figure 2:
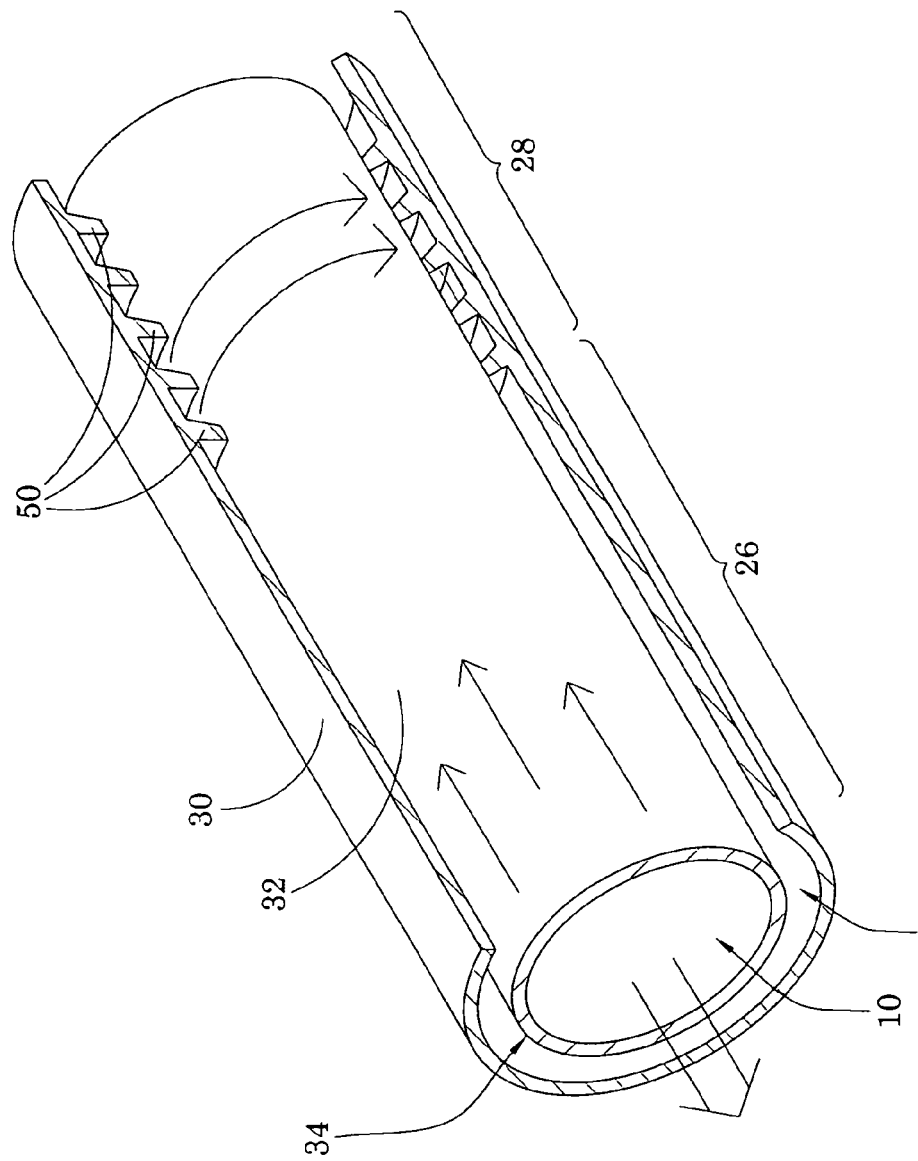
FIG. 2 is a partially perspective view of the direct expansion evaporator according to the preferred embodiment of the present invention, illustrating the relationship between the feeding direction of the raw material and the flow direction of the refrigerant.

Referring to FIGS. 1 and 2 of the drawings, a direct expansion evaporator according to a preferred embodiment of the present invention is illustrated, wherein the direct expansion evaporator is adapted for heat-exchanging with a heat source. According to the preferred embodiment, the direct expansion evaporator is incorporated with a refrigeration system for making a frozen product from a raw material. For example, a heat exchanger of the direct expansion evaporator is provided to supply a thermal energy for exchanging heat between a refrigerant 60 and the raw material, so as to make the frozen product.

The direct expansion evaporator comprises a feeding channel 10 and a heat exchange channel 20 thermally communicating with the feeding channel 10 for heat exchanging.

The feeding channel 10 has a feeding end 12 and an opposite dispensing end 14 for the raw material feeding through the feeding channel 10 from the feeding end 12 to the dispensing end 14.

The heat exchange channel 20 has an inlet 22 and an outlet 24 preferably for the refrigerant 60 flowing through the heat exchange channel 20, wherein the feeding channel 10 is coaxially aligned with the heat exchange channel 20. Accordingly, the refrigerant 60 is guided to pass through the heat exchange channel 20 from the inlet 22 to the outlet 24 for heat exchanging with the raw material within the feeding channel 10. In other words, the raw material is guided to enter into the feeding end 12 of the feeding channel 10 while the frozen product is guided to exit the dispensing end 14 of the feeding channel 10.

The inlet 22 of the heat exchange channel 20 is preferably located adjacent to the dispensing end 14 of the feeding channel 10, while the outlet 24 of the heat exchange channel 20 is located adjacent to the feeding end 12 of the feeding channel 10, so that the heat exchanging rate is maximized. Therefore, a flow direction of the refrigerant flowing from the inlet 22 to the outlet 24 of the heat exchange channel 20 is concurrent and opposite to a feeding direction of raw material feeding from the feeding end 12 to the dispensing end 14 of the feeding channel 10, so as to efficiently freezing the raw material to the frozen product.

It is appreciated that the flowing direction of the refrigerant and the feeding direction of the raw material may be in the same direction depending on the design and purpose of the direct expansion evaporator. However, the opposite direction between the refrigerant 60 and the raw material as the preferred embodiment will enhance the energy efficiency of the heat exchange process.

In the preferred embodiment of the present invention, the thermal energy, which is needed for making the frozen product, is preferably through the phase change between a liquid phase and a gaseous of the refrigerant 60. The refrigerant 60 is preferably in liquid phase under a predetermined high pressure before entering into the heat exchange channel 20 through the inlet 22. The liquid phase refrigerant 60 is rapidly converting into gaseous phase after the refrigerant 60 entering the heat exchange channel 20 due to an expansion of area within the heat exchange channel 20 and a pressure drop to decrease the boiling point of the refrigerant 60, so that a negative thermal energy is released via the absorption of the phase change of the refrigerant 60 from liquid to gaseous state. Thus, the refrigerant 60 is able to be evaporated to gaseous phase in an expansion manner, so as to prevent a back flow of the liquid refrigerant 60 and enhance the cooling capacity.

In other words, the liquid refrigerant 60 is in gaseous phase exiting the heat exchange channel 20 through the outlet 24, such that the thermal energy can be totally release from the phase change of liquid refrigerant 60 to gaseous state. For example, the refrigerant 60 may be stored in a high pressure container in liquid state. The liquid refrigerant 60 may be entered into the heat exchange channel 20 in a pressurized manner, so that the liquid refrigerant 60 is rapidly evaporated in the relatively lower pressure and larger space of heat exchange channel 20. The conversion of the liquid phase to gaseous phase is an absorption reaction, so that the refrigerant 60 absorbs a significant amount of heat from the raw material in the feeding channel 10, so as to release negative thermal energy for making the frozen product.

Accordingly, the heat exchange channel 20 has a pre-cooling portion 28 defining from the feeding end 12 of the feeding channel 10 and a freezing portion 26 thermally communicating with the feeding channel 10 for making the raw material to the frozen product in a two-stage evaporation manner. The freezing portion 26 of the heat exchange channel 20 is preferably located adjacent to the dispending end 14 of the feeding channel 10, and the pre-cooling portion 28 of the heat exchange channel 20 is preferably located adjacent to the feeding end 12 of the feeding channel 10, such that the raw material is able to be frozen in the two-stage manner, so as to enhance the efficiency for making the frozen product via the direct expansion evaporator.

In the pre-cooling stage, the raw material is initially pre-cooled at a predetermined pre-cooled temperature when the raw material is fed into the feeding end 12 of the feeding channel 10 in responsive to the pre-cooling portion 26 of the heat exchange channel 20. In the freezing stage, the pre-cooled raw material is further being frozen at a predetermined frozen temperature to form the frozen product from the raw material within the feeding channel 10 in responsive to the freezing portion 26 of the heat exchange channel 20, in such a manner that the frozen product is able to be efficiently reducing the temperature in the freezing stage.

Therefore, the flowing direction of the refrigerant 60 at the freezing portion 26 of the heat exchange channel 20 is preferably parallel to the feeding direction of the raw material at the feeding channel 10, while the flowing direction of the refrigerant 60 at the pre-cooling portion 28 of the heat exchange channel 20 is tangent to the feeding direction of the raw material at the feeding channel 10, so as to prolong the traveling time and distance in the pre-cooling portion 28 of the heat exchange channel 20.

In the preferred embodiment of the present invention, the direct expansion evaporator preferably comprises an outer guiding duct 30 and an inner guiding duct 32 coaxially surrounded by the outer guiding duct 30 to define the heat exchange channel 20 between the outer guiding duct 30 and the inner guiding duct 32. The feeding channel 10, thus, is defined within the inner guiding duct 32. In other words, the heat exchange channel 20 is formed between an inner wall of the outer guiding duct 30 and an outer wall of the inner guiding duct 32. The feeding channel 10 is formed within the inner wall of the inner guiding duct 32. Therefore, the refrigerant 60 flowing within the heat exchange channel 20 is thermally and conductively communicating with raw material through an outer surface 34 of the inner guiding duct 32 to an inner surface 36 of the inner guiding duct 32. Preferably, the feeding channel 10 is made by a material having a relatively high thermal conductive coefficient for efficiently and conductively transferring thermal energy between the raw material and the refrigerant 60.

As shown in FIG. 1, the inlet 22 of the heat exchange channel 20 is radially formed at an end of the outer guiding channel 30 at a position close to the dispensing end 14 of the feeding channel 10. The outlet 24 of the heat exchange channel 20 is radially formed at an opposed end of the outer guiding channel 30 at a position close to the feeding end 12 of the feeding channel 10.

As will be appreciated, the heat exchange channel 20 and the feeding channel 10 may be formed in variety of shapes for the refrigerant 60 and raw material passing therewithin respectively. The heat exchange channel 20 may thermally communicate with the feeding channel 10 for heat exchanging with the raw material in a plurality of configurations to achieve the heat transport between one medium, embodied as refrigerant, to another medium, embodied as raw material for making frozen product.

More specifically, the outer guiding duct 30 and inner guiding duct 32 may have tubular shape, wherein the outer guiding duct 30 is preferably coaxially enclosing the inner guiding duct 32 to form the heat exchange channel 20 therebetween, so that the refrigerant 60 is surrounding the feeding channel 10 for thermally communicating with the raw material at the feeding channel 10. It is worth to mention that the coaxially tubular configuration of the heat exchange channel 20 and feeding channel 10 provides a relatively larger heat exchange area, so as to enhance the ability for freezing the raw material to the frozen product having the desired low temperature.

As shown in FIG. 1, a front panel 40 and a rear cover 42 may further provided for air-sealing the heat exchange channel 20 and the feeding channel 10, wherein the front cover 40 is provided at a position adjacent to the dispensing end 14 of the feeding channel 10 and the inlet 22 of the heat exchange channel 20, while the rear cover 42 is provided at a position adjacent to the feeding end 12 of the feeding channel 10 and the outlet 24 of the heat exchange channel 20, so that the refrigerant 60 and raw material within the heat exchange channel 20 and feeding channel 10 respectively are air-sealed therewithin, so as to prevent the waste of thermal energy and the leakage of the refrigerant 60 through the heat exchange channel 20.

In the preferred embodiment of the present invention, at least a sealing ring 44 may further provided at the outer guiding duct 30 at a position between the feeding end 12 of the feeding channel 10 and the outlet 24 of the heat exchange channel 20 in an air-sealed manner, so as to prevent the waste of thermal energy within the heat exchange channel 20 and the feeding channel 10.

The front and rear cover 40, 42 may be made by heat insulated material for providing sufficiently heat insulation protection, so as to ensure the thermal energy generated from the refrigerant is able to substantially transfer to the raw material, so as to increase the energy efficient.

Accordingly, in order to form the pre-cooling portion 28 for pre-cooling the raw material to a predetermined pre-cooled temperature, a guiding wall 50 is preferably extended between the outer guiding duct 30 and the inner guiding duct 32 at the pre-cooling portion 28 in a spiral manner. The freezing portion 26 of the heat exchange channel 20 is embodied as a cylindrical shape between the outer guiding duct 30 and the inner guiding duct 32. Therefore, the guiding wall 50 formed a helix shaped channel at the pre-cooling portion 28 of the heat exchange channel 20, so that a traveling time of refrigerant at the pre-cooling portion 28 is prolonged via prolonging the traveling distance by the guiding wall 50 extended in spiral manner.

Therefore, the freezing portion 26 of the heat exchange channel 20 has a cylindrical shape formed between the outer guiding duct 30 and the inner guiding duct 32, so that it is able to maximize an expansion area of the refrigerant 60 when the liquid refrigerant 60 entering the inlet 22 of the heat exchange channel 20. In other words, when the refrigerant 60 initially enters into the inlet 22 of the heat exchange channel 20, the refrigerant 60 has sufficient heat absorbing power at the freezing portion 26 of the heat exchange channel 20 to freeze the raw material to form the frozen product before the frozen product exits at the dispensing end 14 of the feeding channel 10.

The guiding wall 50, which is extended in spiral manner between the outer and inner guiding duct 30, 32 at the pre-cooling portion 28, forms the helix shaped channel thereat, so that the traveling distance for the refrigerant 60 passing through at the pre-cooling portion 28 is prolonged, so as to prolong the traveling time for the refrigerant 60 being completely evaporated. In other words, when the refrigerant 60 passes along the heat exchange channel 20 from the freezing portion 26 to the pre-cooling portion 24, the heat absorbing power of the refrigerant 60 is gradually reducing. Therefore, the refrigerant 60 at the pre-cooling portion 24 of the heat exchange channel 20 can pre-cool the raw material at the feeding channel 10 when the raw material enters into the feeding channel 10. Throughout the phase change of the refrigerant 60, the refrigerant 60 can initially freeze the raw material at the freezing portion 26 of the heat exchange channel 20 and pre-cool the raw material at the pre-cooling portion 28 of the heat exchange channel 20 while being energy efficient.

It is worth mentioning that the length-ratio of the pre-cooling portion 28 and the freezing portion 26 of the heat exchange channel 20 can be selectively adjusted by the length of the guiding wall 50. Therefore, the total traveling time of the refrigerant 60 along the heat exchange channel 20 can also be selectively adjusted by the physical properties of the refrigerant 60 in responsive to the phase change thereof.

It is appreciated that the helix shaped guiding wall 50 forms a plurality of pitches along an axis of the heat exchange channel 20, which may be uniformly distributed throughout the heat exchange channel 20 at the pre-cooling portion 28 along a helix axis, so as to simply manufacture the helix shaped guiding wall 50.

One skilled in the art will understand that there are a variety ways for prolonging the traveling distance or traveling time of the refrigerant 60 to enable the refrigerant 60 completely evaporated to gaseous phase, so as to prevent the back flow of the liquid refrigerant to significantly reduce the efficiency of the direct expansion evaporator. For example, a plurality of fins may alternatively extend between the outer and inner guiding ducts 30, 32 at the pre-cooling portion 28, so that the traveling distance of the refrigerant 60 is prolonged to ensure completing the phase change of the refrigerant 60.

In the preferred embodiment, the raw material is entered from the feeding end 12 to thermally communicate with the pre-cooling portion 28 of the heat exchange channel 20, so that the raw material is substantially cooled to the predetermined frozen temperature to form the frozen product. The pre-cooled frozen product is further feeding to the dispensing end 14 of feeding channel 10 to thermally communicate with the freezing portion 26 of the heat exchange channel 20 to finish the frozen product.

It is worth to mention that the refrigerant 60, preferably entering at the freezing portion 26 having larger expansion area than the pre-cooling portion 28 through the inlet 22 of the heat exchange channel 20, releases a relatively larger thermal energy, which is negative thermal energy to absorb the heat from the ram material in the feeding channel 10, so that the pre-cooled frozen product in the feeding channel 10 is ensured to be frozen to the predetermined frozen temperature to become the final frozen product, so as to keep the final frozen product dispensed from the dispensing end 14 at a desired frozen temperature. Thus, the frozen product is able to be kept in the predetermined low temperature, so as to ensure the quality of the frozen product.

As mentioned above, the guiding wall 50 in the preferred embodiment may further has a trapezoidal shape having a width gradually reducing from an inner surface of the outer guiding duct 30 to the outer surface 34 of the inner guiding duct 32, in such a manner that the heat exchanging area at the pre-cooling portion 28 between the refrigerant 60 and the raw material is maximized, while the wider width side of the trapezoidal shaped cross section of guiding wall 50 is secured at the inner surface of the outer guiding duct 30 to enhance the structural integrity of the spiral shaped guiding wall 50.

Figure 3:
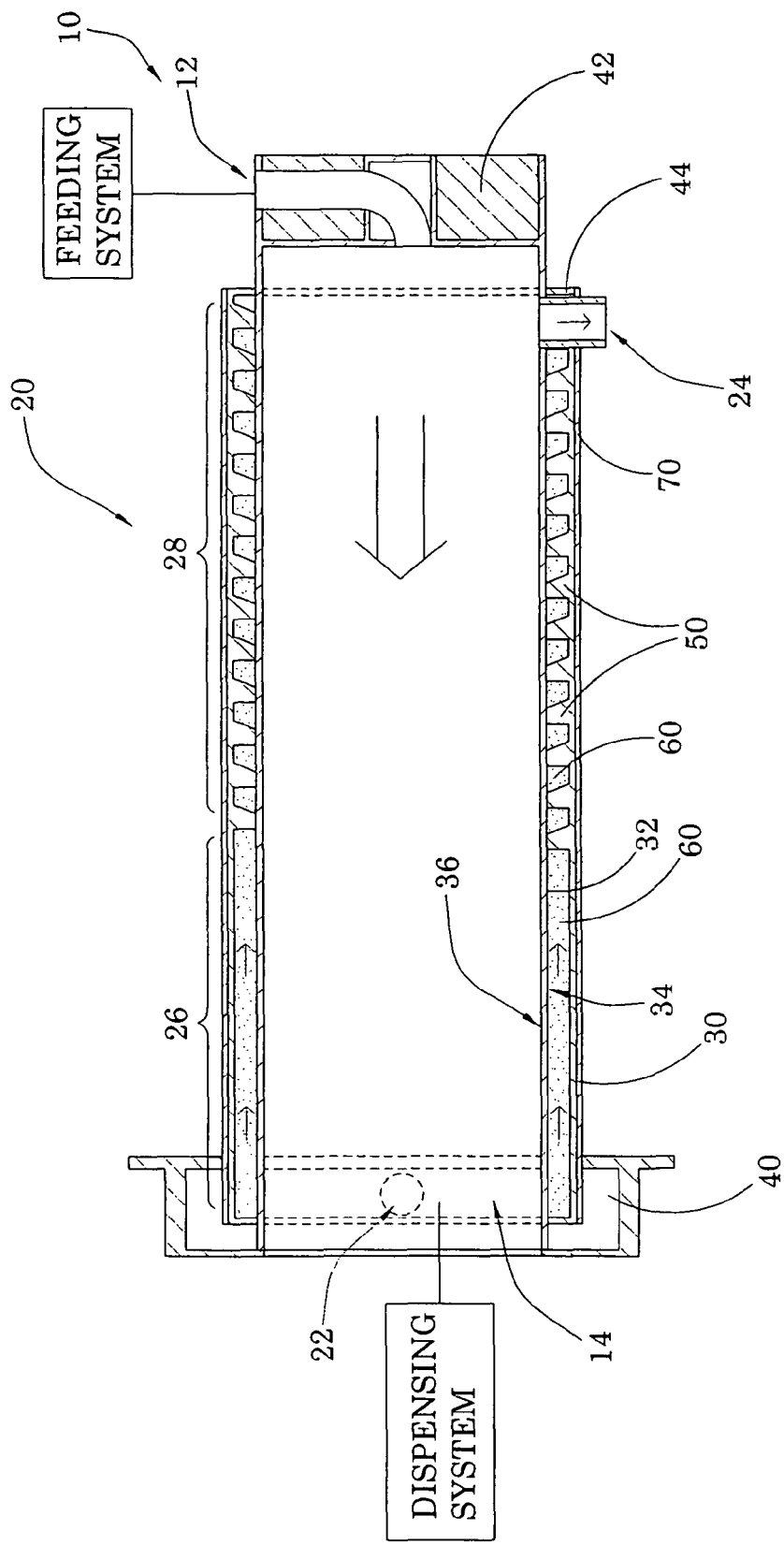
FIG. 3 illustrates an alternative mode of the expansion evaporator according to the preferred embodiment of the present invention, illustrating the insulation layer enclosing the heat exchange channel and the feeding channel.

In order to ensure the heat exchanging substantially occurs only between the refrigerant 60 and the raw material, an insulation layer 70 may further provided to enclose the heat exchange channel 20 and the feeding channel 10 to prevent the thermal energy being conductively or convectively transferred to atmospheres, as shown in FIG. 3. In other words, the insulation layer 70, preferably made by a material having low conductive coefficient, may provided to cover the outer guiding duct 30 to enclose the heat exchange channel 20 and feeding channel 10 in this preferred embodiment of the present invention. The insulation layer 70 is made of insulating material such as polyurethane foam encircling with the outer guiding duct 30 to ensure the refrigerant 60 being heat changed with said raw material through the inner guiding duct 32.

Accordingly, a dispensing system and a feeding system may further incorporate with the direct expansion evaporator, so that the raw material may be prepared for feeding into the feeding channel 10 via the feeding system communicatively connected to the feeding channel 10. The dispensing system may be provided at a position adjacent to the dispensing end 14 of the feeding channel 10, so that the finished frozen product is able to be delivered from the dispensing end 14 through the dispensing system. For example, the dispensing system may include a dispensing valve for being moved between a closed position to air-seal the feeding channel 10 and a dispensing position for outputting the finished frozen product.

In the preferred embodiment of the present invention, a longitudinal propeller (not shown in the figures) of the feeding system may be further coaxially provided within the feeding channel 10 for delivering and blending the raw material from the feeding end 12 to the dispensing end 14 of the feeding channel 10 in a spirally delivering manner. The raw material, such as raw material for making ice cream of frozen product, may be prepared to be feed into the feeding channel 10 from the feeding end 12 via the longitudinal propeller, while being well mixed through the longitudinal propeller.

As described above of the propeller for delivering and mixing the raw material at the feeding channel 10, one skilled in the art will understand that there is variety of ways for delivering and/or mixing the raw material within the feeding channel 10 for making the raw material to frozen product. The raw material may also be incorporated with other configurations or types of feeding system for delivering and/or mixing the raw material at the feeding channel 10.

Accordingly, the direct expansion evaporator may be incorporated with a compressor for recycling the evaporated refrigerant 60 and compressing or condensing the gaseous refrigerant 60 back to the liquid phase, so as to accomplish a heat exchange cycle. The liquefied refrigerant 60 from the compressor may be pumped into a high pressure container for keeping and storing the liquid refrigerant 60 for further expansion evaporating use, so as to be prepared to be entered to the expansion area at the freezing portion 26 of the heat exchange channel 20 for being evaporated to release the negative thermal energy. It will be appreciated that the high pressure liquid refrigerant 60 can be stored in variety ways for entering the heat exchange channel 20 in the expansion manner. The high pressure container is one of the examples for simply transportation and storage of the refrigerant 60.

The freezing portion 26 and pre-cooling portion 28 of the heat exchange channel 20 provides two-stage cooling process for making the frozen product and sufficiently increases the heat exchange rate for cooling system of making frozen product, and is more energy efficient. The cylindrical shaped freezing portion 26 of the heat exchange channel 20 provides a relatively larger expansion area for the liquid refrigerant 60 evaporated to provide the thermal energy for fully cooling the frozen product to desired temperature at the dispensing end 14 of the feeding channel 10, so as to ensure the quality of the frozen product. The pre-cooling portion 28 of the heat exchange channel 20 allows the refrigerant 60 fully evaporated to fully convert the phase change energy to thermal energy, so as to prevent the liquid refrigerant 60 back flowing to the heat exchange cycle to reduce the efficiency of the direct expansion evaporator.

Accordingly, the present invention allows the refrigerant 60 to evaporate in two stages, so as to provide the following advantages.

1. The refrigerant 60 evaporates in an enlarged space compared with the traditional evaporators, which maximizes the heat exchange area, minimizes energy loss, and allows the refrigerant 60 to fully evaporate. Therefore, the cooling efficiency and speed of the refrigerant 60 for the raw material are significantly enhanced.

2. The refrigerant 60 is utilized to its fully capacity. The freezing portion 26 of the heat exchange channel 20 for the first stage evaporation is located around the dispensing end 14 of the feeding channel 10 for dispensing the frozen product therefrom. When the liquid refrigerant 60 enters the heat exchange channel 20 through the expansion valve or the capillary tube, the refrigerant 60 absorbs the majority of heat from the raw material. Then, when the refrigerant 60 enters the pre-cooling portion 28 of the heat exchange channel 20 for its second stage evaporation, the refrigerant 60 will continue to absorb heat from the raw material at the feeding channel 10. This configuration allows the raw material entering the feeding end 12 of the feeding channel 10 to be pre-cooled at the second stage evaporation of the refrigerant 60. As the raw material moves towards the dispensing end 14 of the feeding channel 10, the raw material is cooled down rapidly by the violent first stage evaporation of the refrigerant 60 and forms the frozen product.

3. The helix shaped channel of the heat exchange channel 20 at the pre-cooling portion 28 thereof provides sufficient traveling distance and time for the complete phase change of the refrigerant 60 from liquid to vapor. The full evaporation of the refrigerant 60 prevents liquid back flow to the compressor and enhances the system cooling capacity.

4. With the significant reduction of the length of the helix shaped channel of the heat exchange channel 20 compared with the traditional spiral channel type evaporator, the direct expansion evaporator is easier to be manufactured. Hence, the cost of the direct expansion evaporator is significantly lower and is more suitable for mass production.

Figure 4:
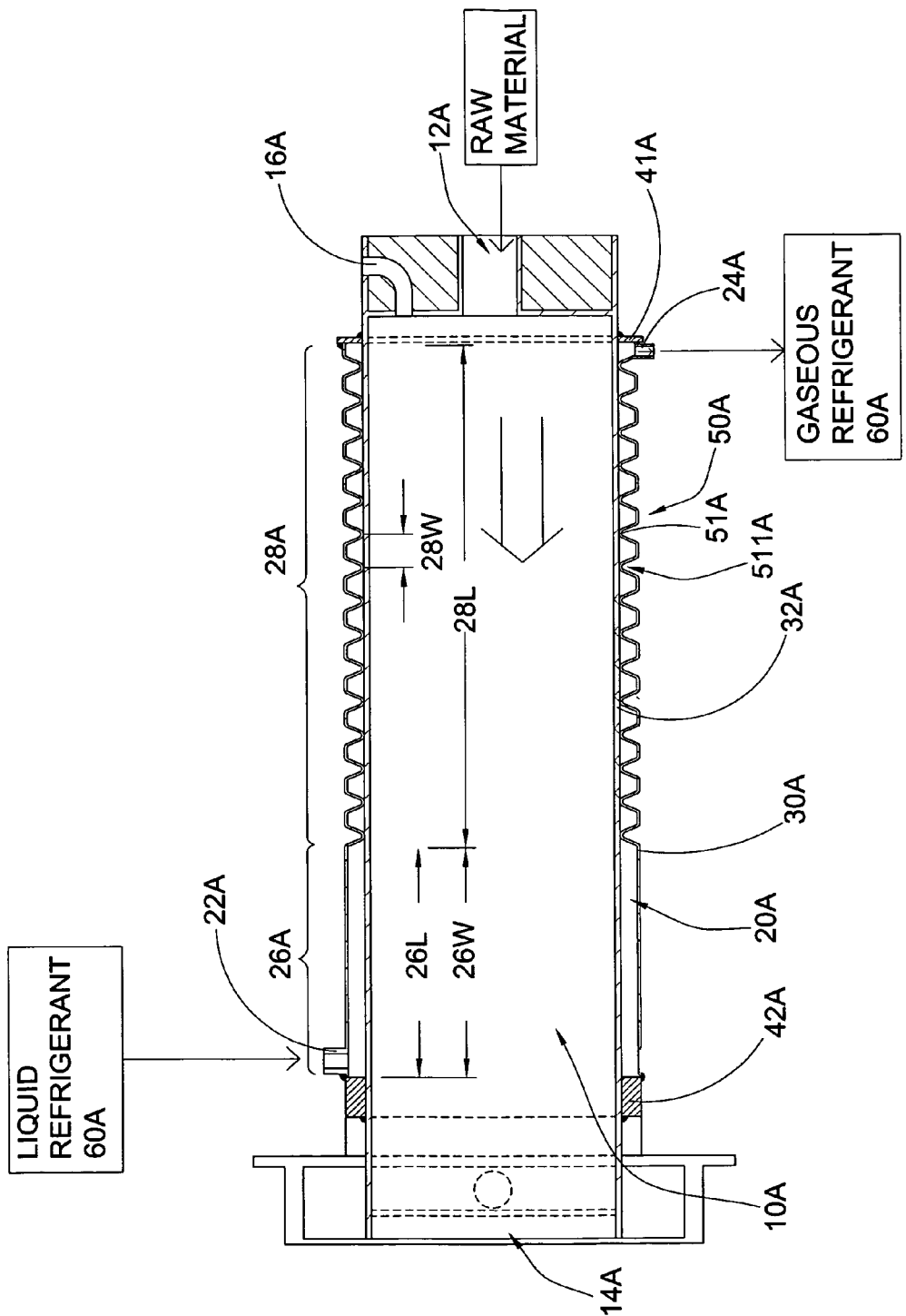
FIG. 4 is a sectional view of a direct expansion evaporator according to a second preferred embodiment of the present invention.

As shown in FIG. 4, a direct expansion evaporator according to a second embodiment illustrates an alternative mode of the first embodiment, wherein the direct expansion evaporator of the second embodiment is a modification of the first embodiment.

Figure 5:
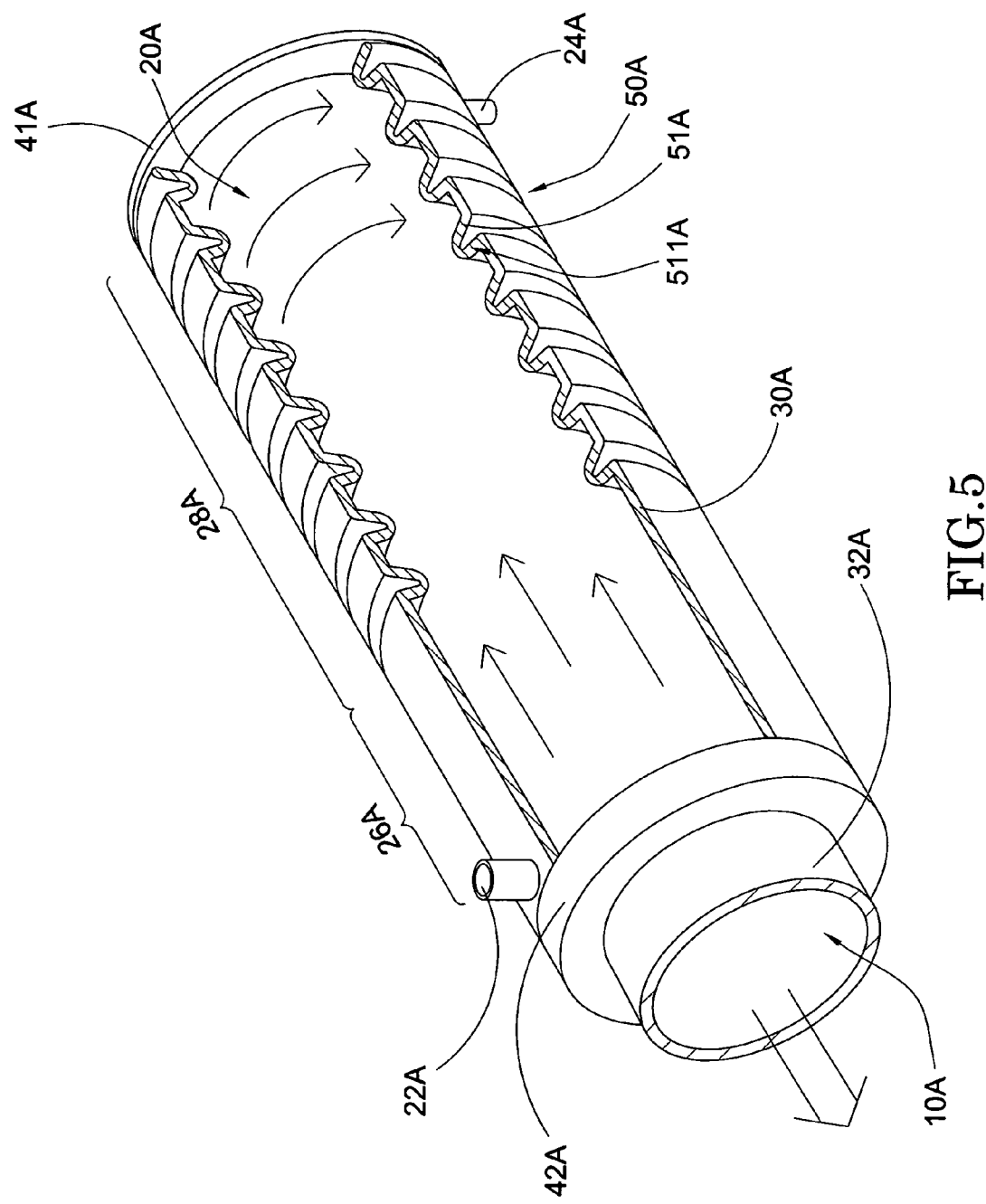
FIG. 5 is a partially perspective view of the direct expansion evaporator according to the second preferred embodiment of the present invention, illustrating the relationship between the feeding direction of the raw material and the flow direction of the refrigerant.
Figure 6:
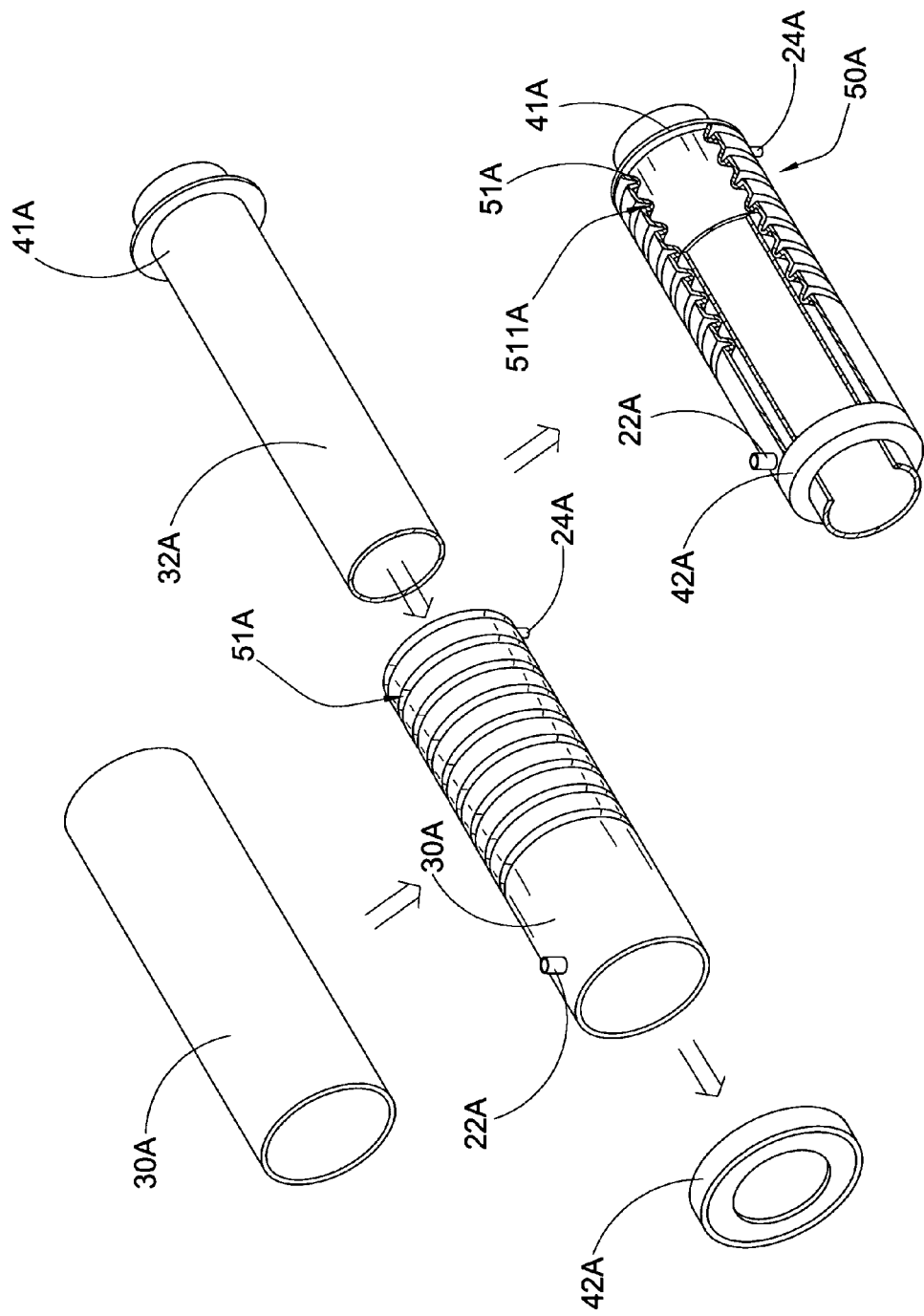
FIG. 6 illustrates a method of manufacturing the direct expansion evaporator according to the second preferred embodiment of the present invention.

As shown in FIGS. 4 and 5, the direct expansion evaporator is adapted for heat-exchanging with a heat source. According to the preferred embodiment, the direct expansion evaporator is incorporated with a refrigeration system for making a frozen product from a raw material. For example, a heat exchanger of the direct expansion evaporator is provided to supply a thermal energy for exchanging heat between a refrigerant 60 and the raw material, so as to make the frozen product.

Therefore, in the preferred embodiment of the present invention, the direct expansion evaporator not only can be used for producing a normal ice cream of the frozen product, but also for efficiently producing a frozen yogurt, which may need relatively more thermal energy for freezing the raw material to the frozen yogurt.

The direct expansion evaporator comprises a feeding channel 10A and a heat exchange channel 20A thermally communicating with the feeding channel 10A for heat exchanging.

The feeding channel 10A has a feeding end 12A and an opposite dispensing end 14A for the raw material feeding through the feeding channel 10A from the feeding end 12A to the dispensing end 14A. An air inlet 16A is also formed at the feeding end 12A of the feeding channel 10A to enable air and raw material being mixed together before the raw material is heat-exchanged with the refrigerant 60A.

The heat exchange channel 20A has an inlet 22A and an outlet 24A preferably for the refrigerant 60A flowing through the heat exchange channel 20A, wherein the feeding channel 10A is coaxially aligned with the heat exchange channel 20A. Accordingly, the refrigerant 60A is guided to pass through the heat exchange channel 20A from the inlet 22A to the outlet 24A for heat exchanging with the raw material within the feeding channel 10A. Therefore, the raw material is guided to enter into the feeding end 12A of the feeding channel 10A while the frozen product is guided to exit the dispensing end 14A of the feeding channel 10A.

According to the second embodiment of the present invention, the direct expansion evaporator is constructed to comprise an outer guiding duct 30A and an inner guiding duct 32 coaxially surrounded within the outer guiding duct 30A. The feeding channel 10 is formed within the inner guiding duct 32A for guiding the raw material flowing within the inner guiding duct 32A from the feeding end 12A to the dispensing end 14A. The heat exchange channel 20 is formed between the outer guiding duct 30A and the inner guiding duct 32A. In other words, the heat exchange channel 20A is formed between an inner surrounding wall of the outer guiding duct 30A and an outer surrounding wall of the inner guiding duct 32A. The feeding channel 10A is formed within the inner surrounding wall of the inner guiding duct 32A. Therefore, the refrigerant 60A flowing within the heat exchange channel 20A is thermally and conductively communicating with raw material through an outer surface of the inner guiding duct 32A to an inner surface of the inner guiding duct 32A. The inner guiding duct 30A is made of thermal conductive material, such as copper, to enable heat exchange between the raw material and the refrigerant 60A through the wall of the inner guiding duct 32A. Preferably, the inner guiding duct 32A is made by a material having a relatively high thermal conductive coefficient for efficiently and conductively transferring thermal energy between the raw material and the refrigerant 60A.

As shown in FIG. 4, the inlet 22A of the heat exchange channel 20A is preferably located adjacent to the dispensing end 14A of the feeding channel 10A, while the outlet 24A of the heat exchange channel 20A is located adjacent to the feeding end 12A of the feeding channel 10A. Therefore, a flow direction of the refrigerant 60A flowing from the inlet 22A to the outlet 24A of the heat exchange channel 20A is concurrent and opposite to a feeding direction of raw material feeding from the feeding end 12A to the dispensing end 14A of the feeding channel 10A, so as to efficiently freezing the raw material to the frozen product.

It is appreciated that the flowing direction of the refrigerant 60A and the feeding direction of the raw material may be in the same direction depending on the design and purpose of the direct expansion evaporator. However, the opposite direction between the refrigerant 60A and the raw material as the preferred embodiment will enhance the energy efficiency of the heat exchange process.

In particular, the inlet 22A of the heat exchange channel 20A is radially and outwardly formed at an end of the outer guiding channel 30A at a position close to the dispensing end 14A of the feeding channel 10A. The outlet 24A of the heat exchange channel 20A is radially and outwardly formed at an opposed end of the outer guiding channel 30A at a position close to the feeding end 12A of the feeding channel 10A.

As will be appreciated, the heat exchange channel 20A and the feeding channel 10A may be formed in variety of shapes for the refrigerant 60A and raw material passing therewithin respectively. The heat exchange channel 20A may thermally communicate with the feeding channel 10A for heat exchanging with the raw material in a plurality of configurations to achieve the heat transport between one medium, embodied as refrigerant, to another medium, embodied as raw material for making frozen product.

More specifically, the outer guiding duct 30A and inner guiding duct 32A may have tubular shape, wherein the outer guiding duct 30A is preferably coaxially enclosing the inner guiding duct 32A to form the heat exchange channel 20A therebetween, so that the refrigerant 60A is surrounding the feeding channel 10A for thermally communicating with the raw material at the feeding channel 10A. It is worth to mention that the coaxially tubular configuration of the heat exchange channel 20A and feeding channel 10A provides a relatively larger heat exchange area, so as to enhance the ability for freezing the raw material to the frozen product having the desired low temperature.

According to the second embodiment, the heat exchange channel 20A has a helix path configuration extended from the dispensing end 14A of the feeding channel 10A to the feeding end 12A thereof. In other words, the refrigerant 60A is guided to flow in a helix path along the outer surrounding wall of the inner guiding duct 32A to heat-exchange with the raw material within the inner guiding duct 32A.

In particular, the traveling path of the heat exchange channel 20A, i.e. the helix distance between the inlet 22A and the outlet 24A of the heat exchange channel 20A, is long enough for phase-changing the refrigerant 60A that the refrigerant 60A is in liquid phase under a predetermined high pressure when entering into the heat exchanging channel 20A and is in gaseous phase when exiting the heat exchanging channel 20A.

Accordingly, the thermal energy, which is needed for making the frozen product, is preferably through the phase change between the liquid phase and the gaseous of the refrigerant 60A. The refrigerant 60A is preferably in liquid phase under a predetermined high pressure when entering into the heat exchange channel 20A through the inlet 22. The liquid phase refrigerant 60A is rapidly converting into gaseous phase after the refrigerant 60A entering the heat exchange channel 20A due to an expansion of area within the heat exchange channel 20A and a pressure drop to decrease the boiling point of the refrigerant 60A. In addition, the thermal energy is exchanged between the refrigerant 60A and the raw material. Therefore, a negative thermal energy is released via the absorption of the phase change of the refrigerant 60A from liquid to gaseous state. Thus, the refrigerant 60A is able to be evaporated to gaseous phase in an expansion manner, so as to prevent a back flow of the liquid refrigerant 60A and to maximize the cooling capacity.

In other words, the liquid refrigerant 60A is in gaseous phase exiting the heat exchange channel 20A through the outlet 24A, such that the thermal energy can be totally release from the phase change of liquid refrigerant 60A to gaseous state. For example, the refrigerant 60A may be stored in a high pressure container in liquid state. The liquid refrigerant 60A may be entered into the heat exchange channel 20A in a pressurized manner, so that the liquid refrigerant 60A is rapidly evaporated in the relatively lower pressure and larger space of heat exchange channel 20A. The conversion of the liquid phase to gaseous phase is an absorption reaction, so that the refrigerant 60A absorbs a significant amount of heat from the raw material in the feeding channel 10A, so as to release negative thermal energy for making the frozen product.

In order to form the heat exchange channel 20A from the outer guiding duct 30A, the outer guiding duct 30A is pressed by machine at the outer surrounding wall of the outer guiding duct 30A. Accordingly, a helix indention 50A is formed at the outer guiding duct 30A to form the heat exchange channel 20A partitioned by a helix partition 51A, wherein a peak 511A of the helix partition 51A is biased against the outer surrounding wall of the inner guiding duct 32A to conceal the heat exchange channel 20A along the inner guiding duct 32A in a weld-less manner.

As shown in FIG. 5, the helix partition has a V-shaped configuration pointing toward the outer surrounding wall of the inner guiding duct 32A, wherein a circumferential size of the peak 511A of the helix partition 51A is slightly smaller than a circumferential size of the outer surrounding wall of the inner guiding duct 32. Therefore, when the inner guiding duct 32A is coaxially received within the outer guiding duct 30A, the peak 511A of the helix partition 51A is slightly elastic-deformed to bias against the outer surrounding wall of the inner guiding duct 32A so as to form the heat exchange channel between the inner and outer guiding ducts 32A, 30A. In other words, the inner diameter of the heat exchange channel 20A is slightly smaller than an outer diameter of the inner guiding duct 32A, such that the peak 511A of the helix partition 51A will be sealed and contacted with the outer surrounding wall of the inner guiding duct 32A so as to ensure the refrigerant 60A being guided to flow in a helix configuration. It is worth mentioning that no welding is required to fix the peak 511A of the helix partition 51A to the outer surrounding wall of the inner guiding duct 32A to secure the inner guiding duct 32A within the outer guiding duct 30A for preventing the refrigerant 60A being leaked through the peak 511A of the helix partition 51A.

For example, the inner diameter of the heat exchange channel 20A is about 89 mm and the outer diameter of the inner guiding duct 32A is about 88 mm. Therefore, when the inner guiding duct 32A is slidably inserted into the outer guiding duct 30A, the outer surrounding wall of the inner guiding duct 32A will substantially engage with the peak 511A of the helix partition 51A that the peak 511A of the helix partition 51A is outwardly and radially pressed to seal with the outer surrounding wall of the inner guiding duct 32A. Preferably, the width of the peak 511A of the helix partition 51A is about 0.5 mm that the peak 511A of the helix partition 51A is biased against and engaged with the outer surrounding wall of the inner guiding duct 32A. In particular, the peak 511A of the helix partition 51A is tangent to the outer surrounding wall of the inner guiding duct 32A. It is worth mentioning that the thickness of the outer guiding duct 30A is about 1.5 mm and the thickness of the inner guiding duct 30A is about 2 mm. In addition, the contacting engagement between the peak 511A of the helix partition 51A and the outer surrounding wall of the inner guiding duct 32A is secured by the physical properties of the outer and inner guiding ducts 30A, 32A that the contacting engagement may be disengaged when the interior temperature thereof is above 300° C., which is impossible when the refrigerant 60A passes through the heat exchange channel 20A.

As shown in FIGS. 4 and 5, the direct expansion evaporator further comprises first and second retention members 41A, 42A to retain the inner guiding duct 32A within the outer guiding duct 30A. The first retention member 41A forms as a ring shape radially and outwardly protruded at the outer surrounding wall of the inner guiding duct 32A at a position close to the feeding end 12A thereof. The second retention member 42A also forms as a ring shape radially and outwardly protruded at the outer surrounding wall of the inner guiding duct 32A at a position close to the dispensing end 14A thereof.

After the inner guiding duct 32A is inserted into the outer guiding duct 30A, the first and second ends of the outer guiding duct 30A are secured to the first and second retention members 41A, 42A respectively so as to conceal the heat exchange channel 20A between the outer and inner guiding ducts 30A, 32A. Accordingly, the first retention member 41A is sealed at the inner guiding duct 32A by welding. Then, the inner guiding duct 32A is slidably inserted into the outer guiding duct 30A until the first end of the outer guiding duct 30A is biased against the first retention member 41A. Then, the second retention member 42A is affixed to the inner guiding duct 32A to bias the second end of the outer guiding duct 30A. Preferably, the first and second ends of the outer guiding duct 30A are sealed to the first and second retention members 41A, 42A by welding, such that the heat exchange channel 20A is concealed between the outer and inner guiding ducts 30A, 32A.

According to the preferred embodiment, the heat exchange channel 20A has a trapezoidal cross section having a width gradually reducing from the inner guiding duct 32A to the outer guiding duct 30A, in such a manner that the heat exchanging area at the outer surrounding wall of the inner guiding duct 32A will be enlarged to enhance the heat exchange efficiency between the refrigerant 60A and the raw material.

Accordingly, the heat exchange channel 20A has a pre-cooling portion 28A defining from the feeding end 12A of the feeding channel 10A and a freezing portion 26A thermally communicating with the feeding channel 10A for making the raw material to the frozen product in a two-stage evaporation manner. The freezing portion 26A of the heat exchange channel 20A is preferably located adjacent to the dispending end 14A of the feeding channel 10A, and the pre-cooling portion 28A of the heat exchange channel 20A is preferably located adjacent to the feeding end 12A of the feeding channel 10A, such that the raw material is able to be frozen in the two-stage manner, so as to enhance the efficiency for making the frozen product via the direct expansion evaporator.

In the pre-cooling stage, the raw material is initially pre-cooled at a predetermined pre-cooled temperature when the raw material is fed into the feeding end 12A of the feeding channel 10A in responsive to the pre-cooling portion 26A of the heat exchange channel 20A. In the freezing stage, the pre-cooled raw material is further being frozen at a predetermined frozen temperature to form the frozen product from the raw material within the feeding channel 10A in responsive to the freezing portion 26A of the heat exchange channel 20A, in such a manner that the frozen product is able to be efficiently reducing the temperature in the freezing stage.

Therefore, the flowing direction of the refrigerant 60A at the freezing portion 26A of the heat exchange channel 20A is preferably parallel to the feeding direction of the raw material at the feeding channel 10A, while the flowing direction of the refrigerant 60 at the pre-cooling portion 28A of the heat exchange channel 20A is tangent to the feeding direction of the raw material at the feeding channel 10A, so as to prolong the traveling time and distance in the pre-cooling portion 28A of the heat exchange channel 20A.

In addition, the longitudinal width 26W of the heat exchange channel 20A at the dispensing end 14A of the feeding channel 10A is larger than a longitudinal width 28W of the heat exchange channel 20A at the feeding end 12A of the feeding channel 10A. In other words, the longitudinal width 26W of the heat exchange channel 20A at the freezing portion 26A thereof must be larger than the longitudinal width 28W of the heat exchange channel 20A at the pre-cooling portion 28A thereof. In particular, the longitudinal width 26W of the heat exchange channel 20A at the dispensing end 14A of the feeding channel 10A is the same as the longitudinal distance of the freezing portion 26A of the heat exchange channel 20A.

Therefore, the freezing portion 26A of the heat exchange channel 20A is able to maximize an expansion area of the refrigerant 60A when the liquid refrigerant 60A entering the inlet 22A of the heat exchange channel 20A. In other words, when the refrigerant 60A initially enters into the inlet 22A of the heat exchange channel 20A, the refrigerant 60A has sufficient heat absorbing power at the freezing portion 26A of the heat exchange channel 20A to freeze the raw material to form the frozen product before the frozen product exits at the dispensing end 14A of the feeding channel 10A.

The heat exchange channel 20A, which is extended in spiral manner between the outer and inner guiding ducts 30A, 32A at the pre-cooling portion 28A, forms the helix shaped channel thereat, so that the traveling distance for the refrigerant 60A passing through at the pre-cooling portion 28A is prolonged, so as to prolong the traveling time for the refrigerant 60A being completely evaporated. In other words, when the refrigerant 60A passes along the heat exchange channel 20A from the freezing portion 26A to the pre-cooling portion 24A, the heat absorbing power of the refrigerant 60A is gradually reducing. Therefore, the refrigerant 60A at the pre-cooling portion 24A of the heat exchange channel 20A can pre-cool the raw material at the feeding channel 10A when the raw material enters into the feeding channel 10A. Throughout the phase change of the refrigerant 60A, the refrigerant 60A can initially freeze the raw material at the freezing portion 26A of the heat exchange channel 20A and pre-cool the raw material at the pre-cooling portion 28A of the heat exchange channel 20A while being energy efficient.

It is worth mentioning that the length-ratio of the pre-cooling portion 28A and the freezing portion 26A of the heat exchange channel 20A can be selectively adjusted. Therefore, the total traveling time of the refrigerant 60A along the heat exchange channel 20A can also be selectively adjusted by the physical properties of the refrigerant 60 in responsive to the phase change thereof.

Accordingly, a longitudinal length 26L of the freezing portion 26A of the heat exchange channel 20A is shorter than a longitudinal length 28L of the pre-cooling portion 28A of the heat exchange channel 20A. Preferably, the longitudinal length 26L of the freezing portion 26A is about ⅓ of the entire longitudinal length of the outer guiding duct 30A. The longitudinal length 28L of the pre-cooling portion 28A is about ⅔ of the entire longitudinal length of the outer guiding duct 30A. In other words, the entire longitudinal length of the outer guiding duct 30A is the sum of the longitudinal length 26L of the freezing portion 26A and the longitudinal length 28L of the pre-cooling portion 28A.

The present invention further provides a method of manufacturing the direct expansion evaporator for making frozen product from raw material, which comprises the following steps.

(1) Configure the inner guiding duct 32A to define the feeding channel 10A therewithin. Accordingly, the inner guiding duct 32A has a tubular shape with a predetermined length. One end of the inner guiding duct 32A forms the feeding end 12A while an opposed end of the inner guiding duct 32A forms the dispensing end 14A.

Accordingly, the first retention member 41A is affixed to the outer surrounding wall of the inner guiding duct 32A at a position close to the feeding end 12A thereof, preferably by welding.

(2) Receive the inner guiding duct 32A within the outer guiding duct 30A to form the heat exchange channel 20A between the inner and outer guiding ducts 32A, 30A to thermally communicate with the feeding channel 10A. Accordingly, the inner guiding duct 32A is coaxially received in the outer guiding duct 30A, wherein the diameter of the outer guiding duct 30A is larger than the diameter of the inner guiding duct 32A such that the inner guiding duct 32A can be slidably inserted into the outer guiding duct 30A.

(3) Configure the heat exchange channel 20A to form the pre-cooling portion 28A being extended toward the feeding end 12A of the feeding channel 10A and the freezing portion 26A being extended toward the dispensing end 14A. Accordingly, the heat exchange channel 20A has a helix path configuration extended from the dispensing end 14A of the feeding channel 10A to the feeding end 12A thereof. The outer guiding duct 30A is pressed to form the helix indention 50A such that the outer guiding duct 30A is indented in a helix configuration. It is worth mentioning that the circumferential size of the peak 511A of the helix partition 51A is slightly smaller than a circumferential size of the outer surrounding wall of the inner guiding duct 32. Therefore, the inner guiding duct 32A is coaxially slid into the outer guiding duct 30A by high pressure until the peak 511A of the helix partition 51A is slightly elastic-deformed to bias against the outer surrounding wall of the inner guiding duct 32A so as to form the heat exchange channel between the inner and outer guiding ducts 32A, 30A. Accordingly, no welding is required to fix the peak 511A of the helix partition 51A at the outer surrounding wall of the inner guiding duct 32A.

Then, the second retention member 42A is affixed the outer surrounding wall of the inner guiding duct 32A at a position close to the dispensing end 14A thereof, wherein the first and second ends of the outer guiding duct 30A are secured to the first and second retention members 41A, 42A respectively so as to conceal the heat exchange channel 20A between the outer and inner guiding ducts 30A, 32A. Accordingly, the first and second retention members 41A, 42A are sealed at the inner guiding duct 32A and are sealed at two ends of the outer guiding duct 30A by welding.

(4) Guide the raw material and refrigerant 60A passing through the feeding channel 10A and the heat exchange channel 20A respectively for heat-exchanging, wherein the raw material is initially pre-cooled at the pre-cooling portion 28A of the heat exchange channel 20A when entering into the feeding end 12A of the feeding channel 10A and is substantially frozen at the freezing portion 26A of the heat exchange channel 20A to form the frozen product before the frozen product is dispensed at the dispensing end 14A of the feeding channel 10A.

One skilled in the art will understand that there are a variety ways for prolonging the traveling distance or traveling time of the refrigerant 60A to enable the refrigerant 60A completely evaporated to gaseous phase, so as to prevent the back flow of the liquid refrigerant to significantly reduce the efficiency of the direct expansion evaporator. For example, a plurality of fins may alternatively extend between the outer and inner guiding ducts 30A, 32A at the pre-cooling portion 28A, so that the traveling distance of the refrigerant 60A is prolonged to ensure completing the phase change of the refrigerant 60A.

In the preferred embodiment, the raw material is entered from the feeding end 12A to thermally communicate with the pre-cooling portion 28A of the heat exchange channel 20A, so that the raw material is substantially cooled to the predetermined frozen temperature to form the frozen product. The pre-cooled frozen product is further feeding to the dispensing end 14A of feeding channel 10A to thermally communicate with the freezing portion 26A of the heat exchange channel 20A to finish the frozen product.

It is worth mentioning that the refrigerant 60A, preferably entering at the freezing portion 26A having larger expansion area than the pre-cooling portion 28A through the inlet 22A of the heat exchange channel 20A, releases a relatively larger thermal energy, which is negative thermal energy to absorb the heat from the raw material in the feeding channel 10A, so that the pre-cooled frozen product in the feeding channel 10A is ensured to be frozen to the predetermined frozen temperature to become the final frozen product, so as to keep the final frozen product dispensed from the dispensing end 14A at a desired frozen temperature. Thus, the frozen product is able to be kept in the predetermined low temperature, so as to ensure the quality of the frozen product.

In order to ensure the heat exchanging substantially occurs only between the refrigerant 60 and the raw material, an insulation layer as shown in the first embodiment may further provided to enclose the heat exchange channel 20A and the feeding channel 10A to prevent the thermal energy being conductively or convectively transferred to atmospheres. In other words, the insulation layer, preferably made by a material having low conductive coefficient, may provided to cover the outer guiding duct 30A to enclose the heat exchange channel 20A and feeding channel 10A in this preferred embodiment of the present invention. The insulation layer is made of insulating material such as polyurethane foam encircling with the outer guiding duct 30A to ensure the refrigerant 60A being heat changed with said raw material through the inner guiding duct 32A.

Accordingly, a dispensing system and a feeding system may further incorporate with the direct expansion evaporator, so that the raw material may be prepared for feeding into the feeding channel 10A via the feeding system communicatively connected to the feeding channel 10A. The dispensing system may be provided at a position adjacent to the dispensing end 14A of the feeding channel 10A, so that the finished frozen product is able to be delivered from the dispensing end 14A through the dispensing system. For example, the dispensing system may include a dispensing valve for being moved between a closed position to air-seal the feeding channel 10A and a dispensing position for outputting the finished frozen product.

Accordingly, a longitudinal propeller (not shown in the figures) of the feeding system may be further coaxially provided within the feeding channel 10A for delivering and blending the raw material from the feeding end 12A to the dispensing end 14A of the feeding channel 10A in a spirally delivering manner. The raw material, such as raw material for making ice cream of frozen product, may be prepared to be feed into the feeding channel 10A from the feeding end 12A via the longitudinal propeller, while being well mixed through the longitudinal propeller.

It is worth mentioning that no propeller is required in the present invention, wherein the propeller can be optionally incorporated with the direct expansion evaporator. Since the frozen product is formed at the dispensing end 14A of the feeding channel 10A within the freezing portion 26A of the heat exchange channel 20A, the frozen product can be easily pulled out from the dispensing end 14A of the feeding channel 10A. Unlike the conventional direct expansion evaporator, the frozen product is formed at the inlet of the feeding channel such that the propeller must be incorporated to push the frozen product out of the feeding channel for preventing the frozen product being stuck at the inlet of the feeding channel.

As described above of the propeller for delivering and mixing the raw material at the feeding channel 10A, one skilled in the art will understand that there is variety of ways for delivering and/or mixing the raw material within the feeding channel 10A for making the raw material to frozen product. The raw material may also be incorporated with other configurations or types of feeding system for delivering and/or mixing the raw material at the feeding channel 10A.

Accordingly, the direct expansion evaporator may be incorporated with a compressor for recycling the evaporated refrigerant 60A and compressing or condensing the gaseous refrigerant 60A back to the liquid phase, so as to accomplish a heat exchange cycle. The liquefied refrigerant 60A from the compressor may be pumped into a high pressure container for keeping and storing the liquid refrigerant 60A for further expansion evaporating use, so as to be prepared to be entered to the expansion area at the freezing portion 26A of the heat exchange channel 20A for being evaporated to release the negative thermal energy. It will be appreciated that the high pressure liquid refrigerant 60A can be stored in variety ways for entering the heat exchange channel 20A in the expansion manner. The high pressure container is one of the examples for simply transportation and storage of the refrigerant 60A.

The freezing portion 26A and pre-cooling portion 28A of the heat exchange channel 20A provides two-stage cooling process for making the frozen product and sufficiently increases the heat exchange rate for cooling system of making frozen product, and is more energy efficient. The cylindrical shaped freezing portion 26A of the heat exchange channel 20A provides a relatively larger expansion area for the liquid refrigerant 60A evaporated to provide the thermal energy for fully cooling the frozen product to desired temperature at the dispensing end 14A of the feeding channel 10A, so as to ensure the quality of the frozen product. The pre-cooling portion 28A of the heat exchange channel 20A allows the refrigerant 60A fully evaporated to fully convert the phase change energy to thermal energy, so as to prevent the liquid refrigerant 60A back flowing to the heat exchange cycle to reduce the efficiency of the direct expansion evaporator.

Figure 7:
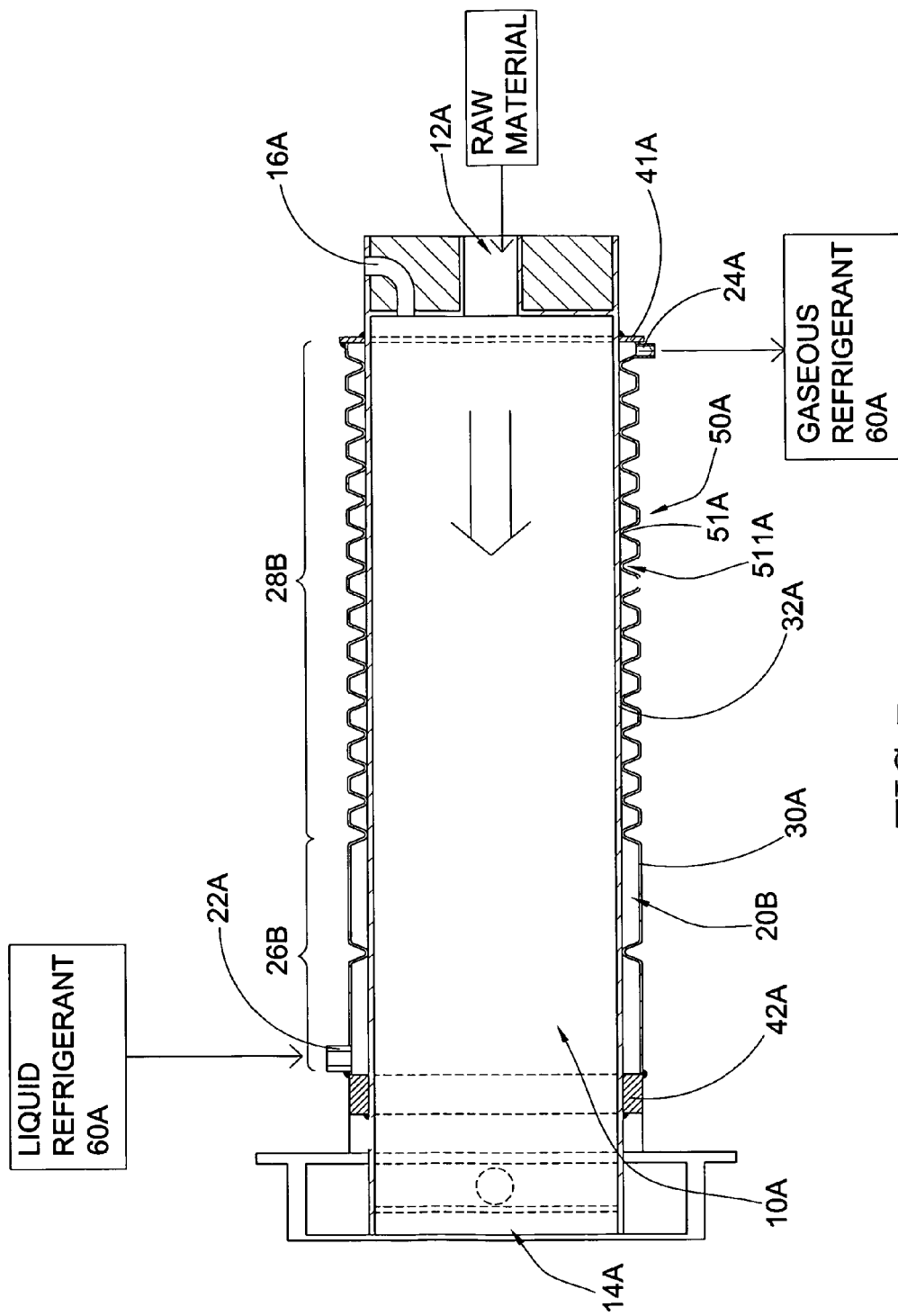
FIG. 7 illustrates a first alternative mode of the heat exchange channel of the direct expansion evaporator according to the second preferred embodiment of the present invention.

FIG. 7 illustrates a first alternative mode of the heat exchange channel 20B, wherein the longitudinal width of the heat exchange channel 20B at the dispensing end 14A of the feeding channel 10A is larger than a longitudinal width of the heat exchange channel 20B at the feeding end 12A of the feeding channel 10A. Therefore, the longitudinal width of the heat exchange channel 20B at the freezing portion 26B thereof must be larger than the longitudinal width of the heat exchange channel 20B at the pre-cooling portion 28B thereof. In particular, the heat exchange channel 20B has a uniform longitudinal width at the freezing portion 26B thereof and has a uniform longitudinal width at the pre-cooling portion 28B thereof. In other words, two uniform longitudinal widths of the heat exchange channel 20B are configured along the feeding channel 10A between the feeding end 12A and the dispensing end 14A.

Figure 8:
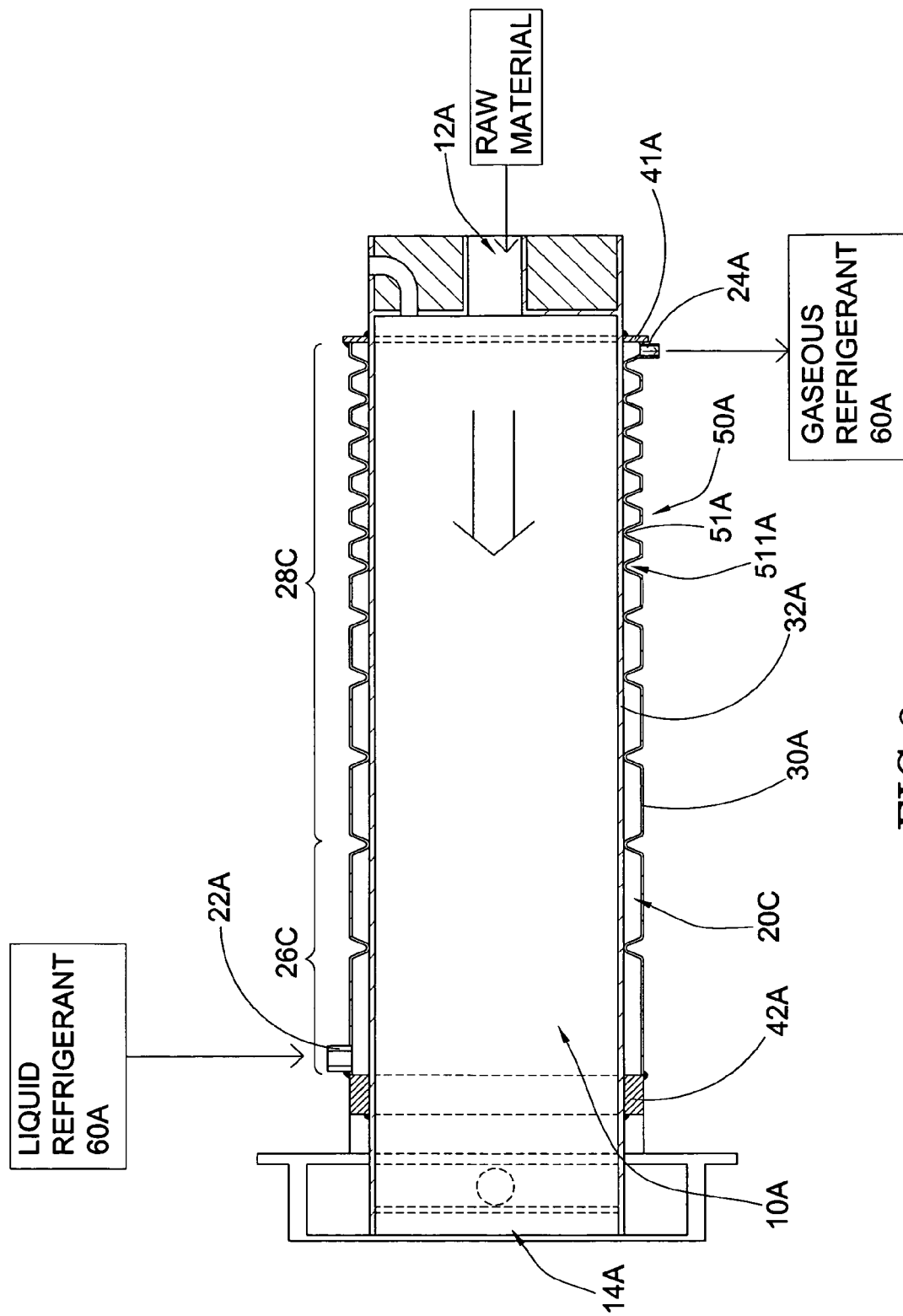
FIG. 8 illustrates a second alternative mode of the heat exchange channel of the direct expansion evaporator according to the second preferred embodiment of the present invention.

FIG. 8 illustrates a second alternative mode of the heat exchange channel 20C, wherein the longitudinal width of the heat exchange channel 20C at the dispensing end 14A of the feeding channel 10A is larger than a longitudinal width of the heat exchange channel 20C at the feeding end 12A of the feeding channel 10A. Therefore, the longitudinal width of the heat exchange channel 20C at the freezing portion 26C thereof must be larger than the longitudinal width of the heat exchange channel 20C at the pre-cooling portion 28C thereof. In particular, the longitudinal width of the heat exchange channel 20B is gradually reduced from the dispensing end 14A of the feeding channel 10A to the feeding end 12A thereof.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A direct expansion evaporator for making frozen product from raw material, comprising:

a feeding channel having a feeding end and a dispensing end for said raw material feeding through said feeding channel;

a heat exchange channel thermally communicating with said feeding channel for guiding refrigerant passing through said heat exchange channel to heat-exchange with said raw material within said feeding channel, wherein said heat exchange channel has a pre-cooling portion formed toward said feeding end of said feeding channel and a freezing portion formed toward said dispensing end to thermally communicate with said feeding channel, wherein said feeding channel is arranged for guiding said raw material to flow from said pre-cooling portion of said heat exchange channel to said freezing portion so as to initially pre-cool said raw material when entering into said feeding end of said feeding channel and to substantially freeze said raw material to form said frozen product before said frozen product is dispensed at said dispensing end of said feeding channel; and an outer guiding duct and an inner guiding duct coaxially enclosed within said outer guiding duct to define said feeding channel within said inner guiding duct and said heat exchange channel between said outer and inner guiding ducts, wherein a helix indention is formed at said outer guiding duct to form said heat exchange channel partitioned by a helix partition, wherein a peak of said helix partition is biased against an outer surrounding wall of said inner guiding duct to conceal said heat exchange channel along said inner guiding duct in a weld-less manner, wherein said helix partition has a V-shaped configuration that a circumferential size of said peak of said helix partition is slightly smaller than a circumferential size of said outer surrounding wall of said inner guiding duct, such that when said inner guiding duct is coaxially received within said outer guiding duct, said peak of said helix partition is slightly elastic-deformed to bias against said outer surrounding wall of said inner guiding duct so as to form said heat exchange channel between said inner and outer guiding ducts.

2. A direct expansion evaporator for making frozen product from raw material, comprising:

a feeding channel having a feeding end and a dispensing end for said raw material feeding through said feeding channel;

a heat exchange channel thermally communicating with said feeding channel for guiding refrigerant passing through said heat exchange channel to heat-exchange with said raw material within said feeding channel, wherein said heat exchange channel has a pre-cooling portion formed toward said feeding end of said feeding channel and a freezing portion formed toward said dispensing end to thermally communicate with said feeding channel, wherein said feeding channel is arranged for guiding said raw material to flow from said pre-cooling portion of said heat exchange channel to said freezing portion so as to initially pre-cool said raw material when entering into said feeding end of said feeding channel and to substantially freeze said raw material to form said frozen product before said frozen product is dispensed at said dispensing end of said feeding channel, wherein said heat exchange channel has a helix path configuration extended from said dispensing end of said feeding channel to said feeding end thereof; and an outer guiding duct and an inner guiding duct coaxially enclosed within said outer guiding duct to define said feeding channel within said inner guiding duct and said heat exchange channel between said outer and inner guiding ducts, wherein a helix indention is formed at said outer guiding duct to form said heat exchange channel partitioned by a helix partition, wherein a peak of said helix partition is biased against an outer surrounding wall of said inner guiding duct to conceal said heat exchange channel along said inner guiding duct in a weld-less manner, wherein said helix partition has a V-shaped configuration that a circumferential size of said peak of said helix partition is slightly smaller than a circumferential size of said outer surrounding wall of said inner guiding duct, such that when said inner guiding duct is coaxially received within said outer guiding duct, said peak of said helix partition is slightly elastic-deformed to bias against said outer surrounding wall of said inner guiding duct so as to form said heat exchange channel between said inner and outer guiding ducts.

3. The direct expansion evaporator, as recited in claim 2, wherein a longitudinal length of said freezing portion of said heat exchange channel is shorter than a longitudinal length of said pre-cooling portion of said heat exchange channel, wherein a longitudinal width of said heat exchange channel at said dispensing end of said feeding channel is larger than a longitudinal width of said heat exchange channel at said feeding end of said feeding channel.

4. A direct expansion evaporator for making frozen product from raw material, comprising:
a feeding channel having a feeding end and a dispensing end for said raw material feeding through said feeding channel; and
a heat exchange channel thermally communicating with said feeding channel for guiding refrigerant passing through said heat exchange channel to heat-exchange with said raw material within said feeding channel, wherein said heat exchange channel has a pre-cooling portion formed toward said feeding end of said feeding channel and a freezing portion formed toward said dispensing end to thermally communicate with said feeding channel, wherein said feeding channel is arranged for guiding said raw material to flow from said pre-cooling portion of said heat exchange channel to said freezing portion so as to initially pre-cool said raw material when entering into said feeding end of said feeding channel and to substantially freeze said raw material to form said frozen product before said frozen product is dispensed at said dispensing end of said feeding channel, wherein a longitudinal width of said heat exchange channel at said dispensing end of said feeding channel is larger than a longitudinal width of said heat exchange channel at said feeding end of said feeding channel.

5. A method of manufacturing a direct expansion evaporator for making frozen product from raw material, comprising the steps of:
(a) configuring an inner guiding duct to define a feeding channel therewithin, wherein said feeding channel has a feeding end and a dispensing end for said raw material feeding through said feeding channel;
(b) receiving said inner guiding duct within an outer guiding duct to form a heat exchange channel between said inner and outer guiding ducts to thermally communicate with said feeding channel;
(c) configuring said heat exchange channel to form a pre-cooling portion being extended toward said feeding end of said feeding channel and a freezing portion being extended toward said dispensing end; and
(d) guiding said raw material and refrigerant passing through said feeding channel and said heat exchange channel respectively for heat-exchanging, wherein said raw material is initially pre-cooled at said pre-cooling portion of said heat exchange channel when entering into said feeding end of said feeding channel and is substantially frozen at said freezing portion of said heat exchange channel to form said frozen product before said frozen product is dispensed at said dispensing end of said feeding channel;
wherein the step (b) further comprises the steps of:
(b.1) forming a helix indention at said outer guiding duct to form said heat exchange channel partitioned by a helix partition; and
(b.2) slidably and coaxially inserting said inner guiding duct into said outer guiding duct, wherein a peak of said helix partition is biased against an outer surrounding wall of said inner guiding duct to conceal said heat exchange channel along said inner guiding duct in a weld-less manner;
wherein said helix partition has a V-shaped configuration that a circumferential size of said peak of said helix partition is slightly smaller than a circumferential size of said outer surrounding wall of said inner guiding duct, such that when said inner guiding duct is coaxially received within said outer guiding duct, said peak of said helix partition is slightly elastic-deformed to bias against said outer surrounding wall of said inner guiding duct so as to form said heat exchange channel between said inner and outer guiding ducts.

6. The method as recited in claim 5 wherein, in the step (c), said heat exchange channel has a helix path configuration extended from said dispensing end of said feeding channel to said feeding end thereof.

7. The method as recited in claim 6 wherein, in the step (c), a longitudinal length of said freezing portion of said heat exchange channel is shorter than a longitudinal length of said pre-cooling portion of said heat exchange channel, wherein a longitudinal width of said heat exchange channel at said dispensing end of said feeding channel is larger than a longitudinal width of said heat exchange channel at said feeding end of said feeding channel.

8. The method as recited in claim 7 wherein, in the step (d), a feeding direction of said raw material along said feeding channel is opposite to a flowing direction of said refrigerant along said heat exchange channel.

9. The method as recited in claim 8 wherein, in the step (b), a traveling path of said heat exchange channel is long enough for phase-changing said refrigerant that said refrigerant is in liquid phase under a predetermined high pressure when entering into said heat exchanging channel and is in gaseous phase when exiting said heat exchanging channel.

10. A method of manufacturing a direct expansion evaporator for making frozen product from raw material, comprising the steps of:
(a) configuring an inner guiding duct to define a feeding channel therewithin, wherein said feeding channel has a feeding end and a dispensing end for said raw material feeding through said feeding channel;
(b) receiving said inner guiding duct within an outer guiding duct to form a heat exchange channel between said inner and outer guiding ducts to thermally communicate with said feeding channel;
(c) configuring said heat exchange channel to form a pre-cooling portion being extended toward said feeding end of said feeding channel and a freezing portion being extended toward said dispensing end, wherein a longitudinal width of said heat exchange channel at said dispensing end of said feeding channel is larger than a longitudinal width of said heat exchange channel at said feeding end of said feeding channel; and
(d) guiding said raw material and refrigerant passing through said feeding channel and said heat exchange channel respectively for heat-exchanging, wherein said raw material is initially pre-cooled at said pre-cooling portion of said heat exchange channel when entering into said feeding end of said feeding channel and is substantially frozen at said freezing portion of said heat exchange channel to form said frozen product before said frozen product is dispensed at said dispensing end of said feeding channel.

11. A direct expansion evaporator for making frozen product from raw material, comprising:

an inner guiding duct defining a feeding channel thereal-
ong and having a feeding end and a dispensing end for
guiding said raw material flowing along said feeding
channel from said feeding end to said dispensing end;
and an outer guiding duct, wherein said inner guiding duct is
coaxially enclosed within said outer guiding duct to
form a heat exchange channel between said outer and
inner guiding ducts for guiding refrigerant flowing along
said heat exchange channel to heat-exchange with said
raw material along said feeding channel, wherein a helix
indention is formed at said outer guiding duct to form
said heat exchange channel partitioned by a helix parti-
tion, wherein a peak of said helix partition is biased
against an outer surrounding wall of said inner guiding
duct to conceal said heat exchange channel along said
inner guiding duct in a weld-less manner, wherein said
helix partition has a V-shaped configuration that a cir-
cumferential size of said peak of said helix partition is
slightly smaller than a circumferential size of said outer
surrounding wall of said inner guiding duct, such that
when said inner guiding duct is coaxially received
within said outer guiding duct, said peak of said helix
partition is slightly elastic-deformed to bias against said
outer surrounding wall of said inner guiding duct so as to
form said heat exchange channel between said inner and
outer guiding ducts.

12. The direct expansion evaporator, as recited in claim 11, wherein said heat exchange channel has a helix path configuration extended from said dispensing end of said feeding channel to said feeding end thereof.

13. The direct expansion evaporator, as recited in claim 12, wherein a feeding direction of said raw material along said feeding channel is opposite to a flowing direction of said refrigerant along said heat exchange channel.

14. The direct expansion evaporator, as recited in claim 13, wherein a traveling path of said heat exchange channel is long enough for phase-changing said refrigerant that said refrigerant is in liquid phase under a predetermined high pressure when entering into said heat exchanging channel and is in gaseous phase when exiting said heat exchanging channel.

* * * * *